(12) United States Patent
Tozawa et al.

(10) Patent No.: US 7,290,148 B2
(45) Date of Patent: Oct. 30, 2007

(54) ENCRYPTION AND DECRYPTION COMMUNICATION SEMICONDUCTOR DEVICE AND RECORDING/REPRODUCING APPARATUS

(75) Inventors: Jun Tozawa, Yokohama (JP); Hiroshi Nogami, Fujisawa (JP); Tetsuya Shibayama, Kodaira (JP); Tomohiro Kataoka, Kokubunji (JP); Hiroshi Fujio, Wako (JP)

(73) Assignee: Renesas Technology Corp., Tokyo (JP)

( * ) Notice: Subject to any disclaimer, the term of this patent is extended or adjusted under 35 U.S.C. 154(b) by 723 days.

(21) Appl. No.: 10/352,876

(22) Filed: Jan. 29, 2003

(65) Prior Publication Data
US 2003/0159062 A1 Aug. 21, 2003

(30) Foreign Application Priority Data
Feb. 21, 2002 (JP) ............................. 2002-044281

(51) Int. Cl.
*H04L 9/00* (2006.01)
*H04K 1/00* (2006.01)

(52) U.S. Cl. .................. 713/189; 713/193; 713/151; 380/255

(58) Field of Classification Search .................. None
See application file for complete search history.

(56) References Cited

U.S. PATENT DOCUMENTS

| | | | | |
|---|---|---|---|---|
| 5,987,126 A * | 11/1999 | Okuyama et al. | ........... | 380/203 |
| 6,118,871 A * | 9/2000 | Okuyama et al. | ........... | 380/201 |
| 6,230,179 B1 * | 5/2001 | Dworkin et al. | ............ | 708/492 |
| 6,463,151 B1 * | 10/2002 | Iitsuka et al. | ............... | 380/201 |
| 6,467,093 B1 * | 10/2002 | Inoue et al. | ................ | 725/151 |
| 6,526,144 B2 * | 2/2003 | Markandey et al. | .......... | 380/28 |
| 6,636,551 B1 * | 10/2003 | Ikeda et al. | ................. | 375/130 |
| 6,965,995 B1 * | 11/2005 | Sato | .......................... | 713/160 |
| 6,975,730 B1 * | 12/2005 | Kuroiwa et al. | ............ | 380/284 |
| 6,996,236 B1 * | 2/2006 | England et al. | ............. | 380/213 |
| 2004/0054914 A1 * | 3/2004 | Sullivan | ..................... | 713/189 |

OTHER PUBLICATIONS

"5C Ditial Transmission Content Protection White Paper", Jul. 14, 1998, Rev 1.0, <URL:http://www.dcp.com/data/wp_spec.pdf> retrieved online Jun. 16, 2006.*

* cited by examiner

*Primary Examiner*—Kambiz Zand
*Assistant Examiner*—Thomas Szymanski
(74) *Attorney, Agent, or Firm*—Miles & Stockbridge PC

(57) ABSTRACT

Disclosed herein is an encryption and decryption communication semiconductor device comprising at least, a communication interface for performing a transfer of data according to a predetermined communication system, one or two or more encryption/decryption circuits which encrypt or decrypt input data in accordance with a predetermined algorithm, and a plurality of external interfaces for performing the input/output of data from and to external devices. The communication interface, the encryption/decryption circuits and the plurality of external interfaces are formed on one semiconductor chip. In the cryption and decryption communication semiconductor device, input data sent from any one of the plurality of external interfaces is encrypted or decrypted by at least one of the encryption/decryption circuits and is capable of being outputted to any different one of the plurality of external interfaces.

2 Claims, 9 Drawing Sheets

ENCRYPTION AND DECRYPTION COMMUNICATION SEMICONDUCTOR DEVICE AND RECORDING/REPRODUCING APPARATUS

BACKGROUND OF THE INVENTION

The present invention relates to a technology for processing digital data and a technology for encrypting and decrypting data. The present invention also relates to, for example, a technology effective for application to the protection of data of digital contents handled by electronic equipment having a serial bus interface of an IEEE1394 (Institute of Electrical and Electronics Engineers 1394) standard, i.e., prevention of illegal copy of data.

The IEEE1394 standard is a standard of a communication interface for serially transmitting digital data such as voice, video, etc. between electronic equipment such as an AV device or apparatus, etc. through cables. In the IEEE1394 standard, data such as voice, video data, etc. which are in need of real-time transfer, make use of isochronous transfer corresponding to a synchronous transfer system, whereas asynchronous transfer corresponding to an asynchronous transfer system is used for the transfer of command data or the like for controlling between AV apparatuses.

In recent years, electronic equipment such as a tuner (i.e., IRD(Integrated Receiver Decoder)), a DTV (Digital Television), a D-VHS (Digital-VHS), an HDD (Hard Disk Drive) recorder, a DVC (Digital Video Camcorder), etc. have respectively been equipped with a serial bus interface of the IEEE1394 standard. Incidentally, the D-VHS, HDD recorder and DVC of the AV apparatuses mentioned above are of recording/reproducing apparatuses each capable of performing recording to a recording medium. Digital contents such as voice data, video data received by these, e.g., the IRD are borne or superimposed on MPEG2-TS (Moving Picture Experts Group Phase 2 Transport Stream) of an ISO/IEC (International Standardization Organization/ International Electrotechnical Commission) 13818 standard, a packet based on an IEC618883 standard, etc. and transmitted to an IEEE1394 spec cable (hereinafter called simply "1394 cable") corresponding to a communication medium of a serial bus (hereinafter called simply "1394 bus") of an IEEE1394 standard, followed by reception thereof with, for example, the D-VHS device, whereby the contents can be recorded in a D-VHS magnetic tape.

However, since the digital contents are not deteriorated in picture quality and sound quality or the like upon their recording even if the digital contents are repeatedly copied again and again, a technology for preventing an illegal copy in terms of protection of copyright is essential to digital contents such as motion pictures, etc. Therefore, as an illegal copy preventions technology intended for IEEE1394, 5C-DTCP (5 Company Digital Transmission Copy Protection) specs determined by a CPTWG (Copy Protection Technical Working Group) as a leading part, which is of an economic group organized by the consumer electronics industry, PC industry and Picture industry or the like, have been put into practical use at present (DTLA issue: refer to 5C Digital Transmission Copy Protection White Paper 1998.7.14).

Copy management under the 5C-DTCP specs is performed by copy management information called an EMI (Encryption Mode Indicator) contained in a packet. The EMI is made up of 2 bits and managed by any mode of ① "copy may be done freely" ② "no copy is permitted" ③ "copy is permitted only once " and ④ "no further copy is permitted" according to the contents thereof. Digital content transmitting electronic equipment inserts the EMI into a packet header of the content to be transmitted and transmits it to the 1394 cable, whereas packet receiving electronic equipment makes a decision as to whether the content should be recorded, from the EMI inserted into the received packet header.

Since plural electronic equipment can be simultaneously connected onto the same bus under the IEEE1394 standard, a digital content can be transmitted from given electronic equipment to the plural electronic equipment. Thus, when, for example, the IRD is transmitting a copy-restricted content to the D-VHS recorder through the 1394 cable, content data can be intercepted by connecting, for example, an illegal device onto the same bus.

Therefore, the 5C-DTCP specs define that when data other than freely copy-permitted contents is transmitted and received through the 1394 cable, a transmitting device encrypts the content and transmits it, whereas a receiving device decrypts the received encrypted content to thereby enable the reproduction and recording of the content. An encryption/decryption system at this time is defined under the 5C-DTCP specs. Only legal or proper devices manufactured under license are capable of transmitting and receiving the copy-restricted content and encrypting and decrypting the same.

The D-VHS device will now be taken by way of example. When a once-only copyable content received via the 1394 cable is recorded, the encrypted content is transferred to the 1394 cable as described above and the D-VHS device decrypts and records it. However, the D-VHS device generally records a non-encrypted content on a D-VHS tape. At this time, however, the copy management information EMI is changed from "copy is permitted only once" to "no further copy is permitted", and this information is also recorded on the tape together. Thus, even when the D-VHS tape having recorded the once-only copyable content thereon is reproduced and the content is transferred to other recording apparatus through the 1394 cable, copy management information EMI of the content received by other recording apparatus is indicative of "no further copy is permitted" and hence the content cannot be recorded, thus resulting in the protection of copyright of the content.

On the other hand, when the HDD recorder records the once-only copyable content received via the 1394 cable according to a system similar to the D-VHS device, since non-encrypted data is recorded in HDD, the HDD is withdrawn from the HDD recorder to thereby allow peeping of the contents of the HDD by a PC or the like and illegal copying. Therefore, the data recorded in the HDD is generally encrypted in the HDD recorder. However, no particular provision exists in this encrypting and recording technology at present. HDD-recorder manufacturers have adopted C2 encrypt recording or the like defined by 4C-Entity in which the standardization of a copyright protection system related to a recording media, for example, has been performed.

As an encryption and decryption communication semiconductor device, there has recently been developed one to which the 5C-DTCP specs are applied and which corresponds to the IEEE1394 standard. It has been posted on a home page of a semiconductor manufacturer or the like on the Internet. This type of cryption and decryption communication semiconductor device has been mounted in many AV apparatuses such as the IRD, D-VHS device, etc. each of which handles an MPEG2-TS format.

One example considered as an encryption and decryption communication semiconductor device, and a configurational example of an HDD recorder mentioned as one example of an MPEG2-TS format AV apparatus are shown in FIG. 10.

In FIG. 10, reference numeral 100 indicates an HDD recorder, and reference numeral 110 indicates an encryption and decryption communication semiconductor device. When the cryption and decryption communication semiconductor device 110 transmits the content to 1394 cables 60, it encrypts data of an MPEG2-TS format sent from an MPEG processing circuit 150 or an encryption/decryption circuit 120 such as an MPEG codec semiconductor device or the like through the use of an encryption/decryption circuit 123 via an external interface I/F (interface) 114 and effects packetize based on the IEC61883 standard on the data by virtue of a packet processing circuit 113. Thereafter, a 1394 LINK (IEEE1394 Link Layer) 111 effects processing of a LINK layer based on the IEEE1394 standard thereon and transmits it to a 1394 PHY (IEEE1394 Physical Layer) 130 used as a physical layer of the IEEE1394 standard, from which the content is transmitted to apparatuses such as an IRD, D-VHS, etc. via the 1394 cables 60 connected to the tip of the 1394 PHY 130.

On the other hand, when the HDD recorder 100 receives the content therein, the 1394 PHY 130 receives a packet sent from the corresponding 1394 cable 60 and the 1394 LINK 111 effects processing of the LINK layer thereon. Thereafter, the packet processing circuit 113 unpacketizes it and the encryption/decryption circuit 123 decrypts encrypted data. Further, the encryption/decryption circuit 123 transmits the decrypted content to the MPEG processing circuit 150 via the external I/F 114, where a process for performing reproduction, recording and the like of the content is carried out.

As another cryption and decryption communication semiconductor device mounted to an HDD recorder, there is considered one having, for example, two pairs of MPEG2-TS format external interfaces and encryption/decryption circuits, and a packet processing circuit. Alternatively, there is considered one wherein an HDD recorder is equipped with the cryption and decryption communication semiconductor device, whereby the content already recorded in HDD can be transmitted to another 1394 corresponding device while the content sent from the corresponding 1394 cable is being recorded therein.

Further, there is also considered an encryption and decryption communication semiconductor device for AV apparatuses, in which an encryption/decryption circuit is provided as one whereas an MPEG2-TS format external interface and a DV format external interface, and two packet processing circuits are provided, and which is configured so as to be capable of coping with an MPEG2-TS format and a DV format. The reason why the cryption and decryption communication semiconductor device builds one encryption/decryption circuit alone therein, is that since data of the DV format is data normally photographed privately with a DVC or the like, it is considered that there is no need to encrypt it in terms of copyright protection at the present moment.

SUMMARY OF THE INVENTION

However, the foregoing cryption and decryption communication semiconductor device and HDD recorder 100 involve the following problems. The first is a problem that since when the HDD recorder 100 receives a copy-restricted content from, for example, the IRD20 via the 1394 cable 60 and records the content in its corresponding HDD 140, the process of decrypting the encrypted content received by the 1394 PHY 130 and the 1394 LINK 111 by the 5C-DTCP encryption/decryption circuit 123 and encrypting it by the HDD recording encryption/decryption circuit 120 is performed, thus causing the need to provide the encryption/decryption circuits in an overlapped form.

As a second problem, the D-VHS device is different from the HDD recorder or the like in that it has the feature that a D-VHS tape corresponding to its media is taken from a device body and is capable of being stored and carried on, and the D-VHS tape can be reproduced even by another D-VHS device. However, the D-VHS device is accompanied by the problem that since no content is encrypted upon recording as in the HDD recorder shown in FIG. 10, it is difficult to limit a viewer of the content recorded on the D-VHS tape. Described specifically, when, for example, a D-VHS user records on the corresponding D-VHS tape, a content that the user desires only a limited person to view, a corrupt person improperly gets a hold of the D-VHS tape to thereby allow viewing of the content recorded on the D-VHS tape by the third party free of audio-visual rights.

An object of the present invention is to provide an encryption and decryption communication semiconductor device capable of realizing protection of the content while reducing the number of built-in encryption/decryption circuits where a digital content recording/reproducing apparatus like an HDD recorder is configured.

Another object of the present invention is to provide an encryption and decryption communication semiconductor device capable of encrypting and recording the content upon recording of a carryable recording media to thereby prevent the recorded content from being easily viewed even when the media falls into the hands of the third party free of viewing rights, and a digital content recording/reproducing apparatus equipped therewith.

Summaries of typical ones of the inventions disclosed in the present application will be described in brief as follows:

In order to solve the first problem in the first instance, the present invention provides an HDD recorder equipped with a 1394 bus interface. In the HDD recorder, an encryption and decryption communication semiconductor device having built therein an encryption/decryption circuit for illegal copy prevention upon transferring the content to a 1394 cable is provided with a plurality of external interfaces. The encryption/decryption circuit of the cryption and decryption communication semiconductor device is configured so as to be capable of being used as a recording encryption processing circuit when an apparatus singly operates. Thus, when a digital content recording/reproducing apparatus like the HDD recorder is configured, the protection of the content can be realized while the number of encryption/decryption circuits to be built therein is being reduced to one.

In this case, as an external content input recorded in a recording medium, there are considered a digital input sent from a 1394 interface or the like and an analog input sent from an analog device or apparatus. However, when the external content input is of the digital input, i.e., it is inputted from the 1394 cable, the encrypted content is inputted to the HDD recorder and hence the inputted encrypted ,content is recorded in the recording medium as it is. On the other hand, when the content is of the analog input, the content is converted into digital data, which is thereafter encrypted by an IEEE1394 encryption/decryption circuit, followed by recording in its corresponding HDD. Thus, since each of the content digitally inputted and recorded in the HDD and the content analogically inputted and recorded therein is also one encrypted by the corresponding IEEE1394 encryption/ decryption circuit, it is decrypted by the corresponding IEEE1394 encryption/decryption circuit upon reproduction, whereby the content can be viewed.

Next, in order to solve the second problem, the present invention provides a recording/reproducing apparatus such as D-VHS or the like having a 1394 bus interface. In the recording/reproducing apparatus, an analogically-inputted content is converted into digital data in a manner similar to the above first solving means, which is thereafter encrypted by an IEEE1394 encryption/decryption circuit, after which the encrypted data can be recorded in a recording medium. Then, a user who operates the apparatus, is able to arbitrarily set whether or not the recorded content should be encrypted. Namely, when the content is encrypted, the user inputs key information such as an identification number or the like to thereby manage viewing restrictions. Consequently, only a person who knows key information such as an identification number or the like set upon recording of the content, is able to reproduce the content.

DETAILED DESCRIPTION OF THE PREFERRED EMBODIMENTS

Preferred embodiments of the present invention will hereinafter be described in detail with reference to the accompanying drawings.

(First Embodiment)

Figure 1:
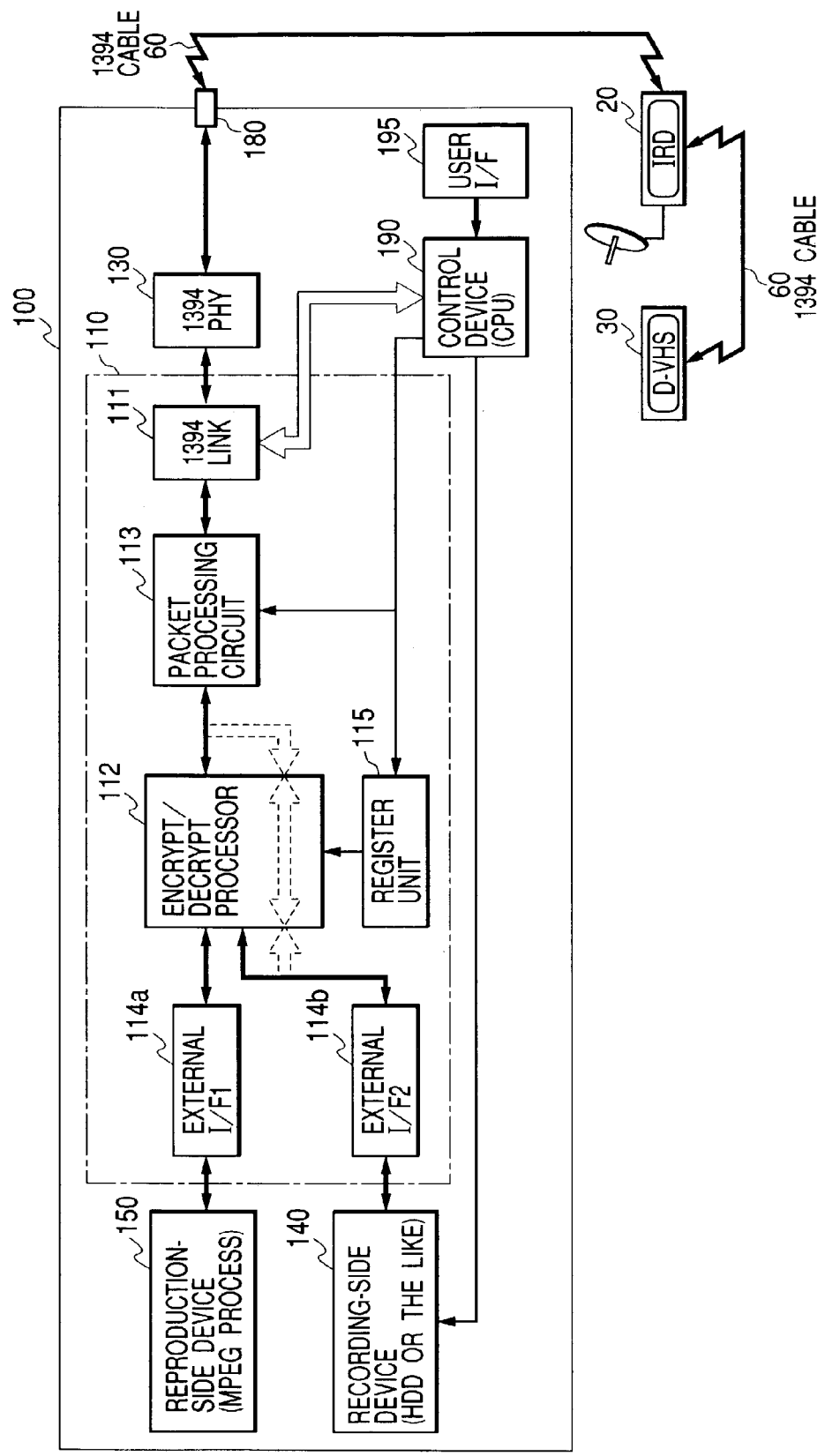
FIG. 1 is a block diagram showing a first embodiment illustrative of an encryption and decryption communication semiconductor device to which the present invention is applied, and a recording/reproducing apparatus equipped therewith.

FIG. 1 shows a first embodiment illustrative of a 5C-DTCP spec cryption and decryption communication semiconductor device to which the present invention is applied, and a recording/reproducing apparatus equipped therewith.

In the present embodiment, a 5C-DTCP spec encrypt/decrypt processor 112, a 1394 LINK 111 which performs the process of transmitting and receiving an isochronous packet and an asynchronous packet based on specs of a LINK layer of the IEEE 1394 standard, a packet processing circuit 113 of the IEC 61883 standard, which performs packetize/unpacketize processes such addition and removal of headers to and from the transmit-receive packets, a first external interface 114a and a second external interface 114b, a register unit 115 which sets operation modes for the encrypt/decrypt processor 112, etc. are formed on one semiconductor chip like monocrystalline silicon and constitute an encryption and decryption communication semiconductor device 110.

The 1394 LINK 111 also performs control on isochronous and asynchronous switching, an address assignment to a, transmit/receive apparatus, an error check for data, cycle control, etc. in addition to the transmission/reception of the packets. The packetize process of the packet processing circuit 113 includes a process for generating a packet of a designated or specified size, addition of a packet number, etc. in addition to the addition of each header. Further, the unpacketize process includes a check of whether a configuration and a data length of each received packet are proper, etc. in addition to the removal of each header.

Figure 2:
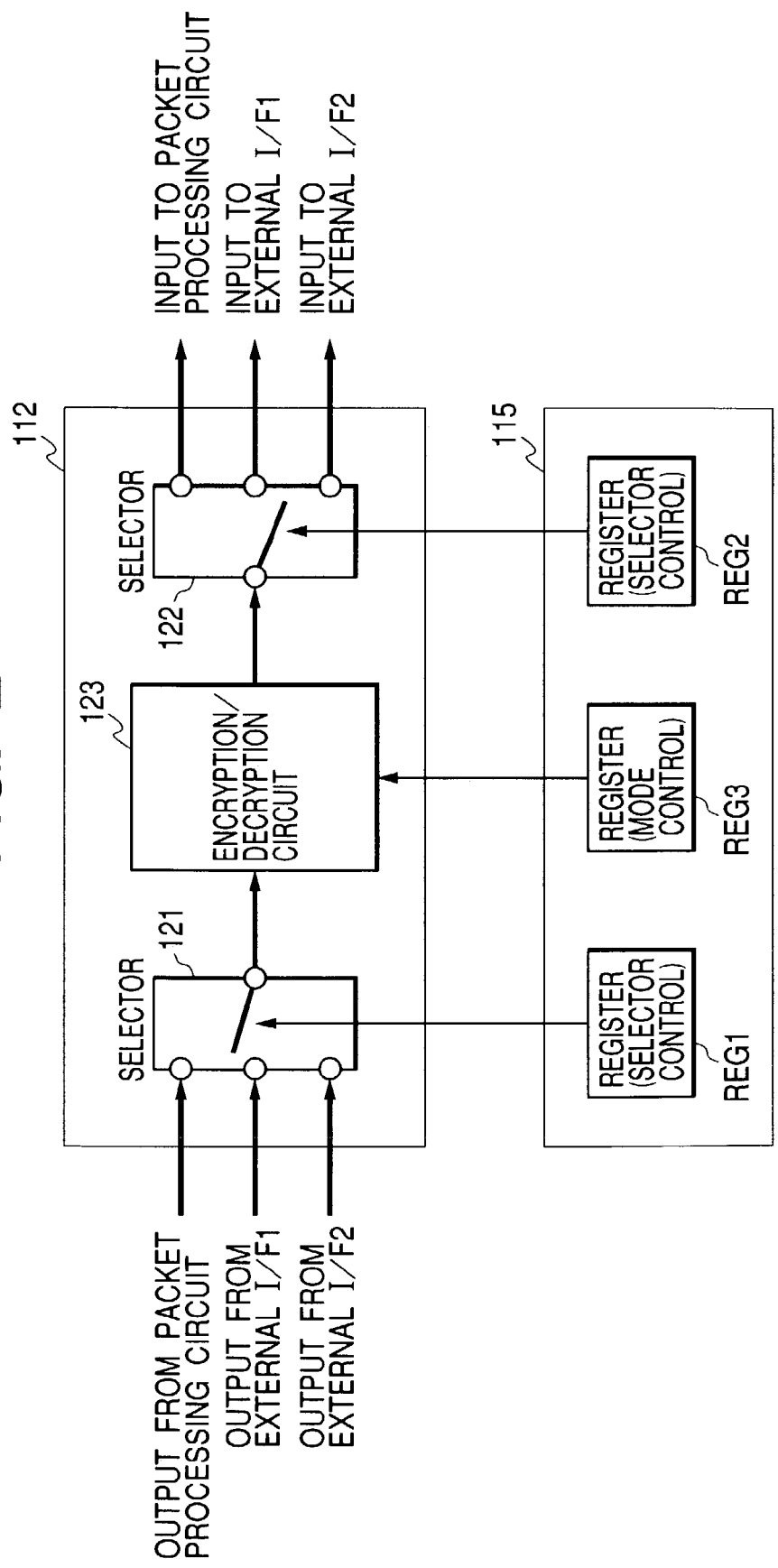
FIG. 2 is a block diagram depicting a configurational example of an encrypt/decrypt processor of the cryption and decryption communication semiconductor device according to the embodiment shown in FIG. 1.

As shown in FIG. 2, the encrypt/decrypt processor 112 comprises an encryption/decryption circuit 123, an input data selector 121 which selects the input of data inputted to the encryption/decryption circuit 123 from the packet processing circuit 113, the input of data from the first external interface 114a, or the input of data from the second external interface 114b, an output data selector 122 which selects the output of data outputted from the encryption/decryption circuit 123 to the packet processing circuit 113, the output of the data to the first external interface 114a, or the output of the data to the second external interface 114b, and so on. Further, the register unit 115 comprises a register REG1 for controlling an input data selector 121, a register REG2 for controlling an output data selector 122, and a mode control register REG3 for selecting an operation mode (corresponding to an encryption mode, a decryption mode or a through mode unintended for both encryption and decryption) of the encryption/decryption circuit 123.

A 1394 PHY chip having a function defined as a physical layer of the IEEE 1394 standard is connected to the 1394 LINK 111. A connector 180 for connecting a 1394 cable 60 is provided ahead of the 1394 PHY chip. A reproduction-side device 150 for data utilization such as an MPEG processing circuit for coding and decoding data set in accordance with the MPEG2 standard, data processing circuits like A/D and D/A converters, etc. is connected to the first external interface 114a, and a recording-side device 140 for data retention such as HDD or the like is connected to the second external interface 114b, whereby an AV recording/reproducing apparatus 100 like an HDD recorder is configured.

A system control device 190 made up of a CPU or the like, which outputs signals for controlling the 1394 LINK 111 and packet processing circuit 113, the cryption and decryption communication semiconductor device 110, the recording-side device 140, and the reproduction-side device 150, and a user interface 195 made up of a control panel and a remote control receiving device or the like for allowing a user to externally give instructions to the system control device 190 are provided inside the apparatus. The setting of control codes to the register unit 115 is performed by the system control device 190.

Further, other digital devices 20 and 30 such as an IRD, D-VHS, etc. are connected to the AV recording/reproducing apparatus 100 via the 1394 cables 60. The control device 190 is capable of transferring commands to and from other devices 20 and 30 through the 1394 cables 60. The commands received through the 1394 cable 60 are separated by the 1394 LINK 111, followed by transfer to the control device 190. Transmit commands for other devices are passed or transferred from the control device 190 to the 1394 LINK 111, where they are assembled into a packet, followed by transmission to the 1394 cable 60. Each of other digital devices 20 and 30 connected to the 1394 cables 60 is also provided with a 1394 connector 180, a 1394 PHY 130, an encryption and decryption communication semiconductor device 110, a control device (CPU) 190, etc. similar to those employed in the recording/reproducing apparatus 100 shown in FIG. 1.

Incidentally, while the 1394 LINK 111, the packet processing circuit 113, the encrypt/decrypt processor 112, the first external interface 114a and second external interface 114b, and the register unit 115 are formed on the single semiconductor chip to constitute the cryption and decryption communication semiconductor device 110, and the 1394 PHY 130 is configured as another chip in the first embodiment, such an encryption and decryption communication semiconductor device 110 as being brought into one chip with even the 1394 PHY 130 included in the same chip may be adopted. It is thus possible to achieve a further cost reduction, decrease the number of parts in the apparatus, and enhance a further packaging density.

The operation of the recording/reproducing apparatus 100 according to the embodiment shown in FIG. 1 where a digital content is transferred, will next be explained. Incidentally, the devices 20 and 30 connected via the 1394 cables 60 will be both defined as devices corresponding to MPEG2-TS format data in the following description.

When the digital content is transferred from the recording/reproducing apparatus 100 to other devices 20 and 30, the external interface 114a or 114b to which its corresponding device having the content to be transferred thereto is connected, is first selected in the cryption and decryption communication semiconductor device 110. When the external interface 114a is selected, the reproduction-side device 150 inputs MPEG2-compressed MPEG2-TS data to the first external interface 114a. When the non-encrypted content recorded in the recording-side device 140 is transferred, the external interface 114b is selected in the cryption and decryption communication semiconductor device 110, the content read from the recording-side device 140 is inputted to the external interface 114b.

In the encrypt/decrypt processor 112, the input data selector 121 selects an input sent from the first external interface or the second external interface by use of the register REG1, and the output data selector 122 selects an output to be supplied to the packet processing circuit 113 by use of the register REG2. Further, the encryption/decryption circuit 123 sets an operation mode to an encryption mode by the register REG3. Consequently, the content inputted to the encrypt/decrypt processor 112 is subjected to 5C-DTCP spec encryption, followed by output to the packet processing circuit 113. The packet processing circuit 113 effects a packetize process based on the IEC61883 standard on the content and transmits the packetized content to the 1394 LINK 111.

While the 1394 LINK 111 assembles transmitted data into a packet based on the IEEE1394 standard, EMI corresponding to copy management information is also additionally provided here. When a digital content to be transferred is of a copy-restricted content indicative of "copy is permitted only once" at this time, the 1394 LINK 111 sets the EMI corresponding to the copy control information to "copy is permitted only once". Subsequently, the 1394 PHY 130 converts the packet sent from the 1394 LINK 111 to an electric signal transmittable to the 1394 cable 60 and transmits the same to the 1394 cable 60 by way of the 1394 connector 180.

A description will next be made of a case in which the recording/reproducing apparatus 100 receives the transfer of an encrypted content from other device. In this case, the recording/reproducing apparatus 100 on the receiving side receives the packet of the IEEE1394 standard transferred via the 1394 cable 60 through the use of the 1394 LINK 111. The 1394 LINK 111 effects a process of the LINK layer based on the IEEE1394 standard on the packet received by the 1394 PHY 130. Now, copy management information is obtained from EMI added to the packet. Thereafter, the packet processing circuit 113 performs an unpacketize process and inputs the encrypted content to the encrypt/decrypt processor 112. When the recording/reproducing apparatus 100 records a received content, the input data selector 121 employed in the encrypt/decrypt processor 112 selects an input sent from the packet processing circuit 113 by means of the register REG1, and the output data selector 122 employed therein selects an output to be supplied to the second external interface by means of the register REG2. Further, the operation mode of the encryption/decryption circuit 123 is set to the through mode by the register REG3.

Thus, the content inputted to the encrypt/decrypt processor 112 is recorded in the recording-side device 140 via the second external interface 114b while remaining encrypted without being decrypted. When the information about EMI received by the 1394 LINK 111 is of the content of "copy is permitted only once" at this time, this copy control information is changed to "no further copy is permitted", followed by recording in the recording-side device 140 together with the content. Consequently, generation management of the copy is enabled.

In the configuration of the cryption and decryption communication semiconductor device according to the present embodiment even except for the above description, the input data selector 121 in the encrypt/decrypt processor 112 is set to the input sent from the packet processing circuit 113 by means of the register REG1, the output data selector 122 in the encrypt/decrypt processor 112 is set to the output supplied to the second external interface by means of the register REG2, and the encryption/decryption circuit 123 is set to the encryption mode by means of the register REG3, whereby it may be feasible to encrypt the non-encrypted content received via the 1394 cable 60 and record it in the recording-side device 140.

On the other hand, when the content received by the recording/reproducing apparatus 100 is reproduced by an analog TV or the like, the input data selector 121 in the encrypt/decrypt processor 112 selects an input sent from the packet processing circuit 113 through the use of the register REG1, and the output data selector 122 in the encrypt/decrypt processor 112 selects an output to be supplied to the first external interface through the use of the register REG2. Further, the operation mode of the encryption/decryption circuit 123 is set to a decryption mode by means of the register REG3. Thus, the content inputted to the encrypt/decrypt processor 112 is decrypted, which in turn is supplied to the reproduction-side device 150 via the first external interface 114a, where it is subjected to data decryption processing of MPEG2, followed by output to the analog TV or the like used as a reproducing device.

Further, the recording/reproducing apparatus 100 according to the embodiment shown in FIG. 1 is capable of performing the operation of reproducing the encrypted content recorded in the recording-side device 140 singly according to such a procedure as will be described later. In this case, the recorded encrypted content is first inputted from the recording-side device 140 to the second external interface 114b. In the encrypt/decrypt processor 112, the input data selector 121 selects an input sent from the second external interface through the register REG1, and the output data selector 122 selects an output to be supplied to the first external interface through the register REG2. Further, the operation mode of the encryption/decryption circuit 123 is set to the decryption mode by the register REG3. Thus, the encrypted content inputted to the encrypt/decrypt processor 112 is decrypted and outputted to the reproduction-side device 150 by way of the first external interface 114a, whereby the content can be reproduced.

Figure 3:
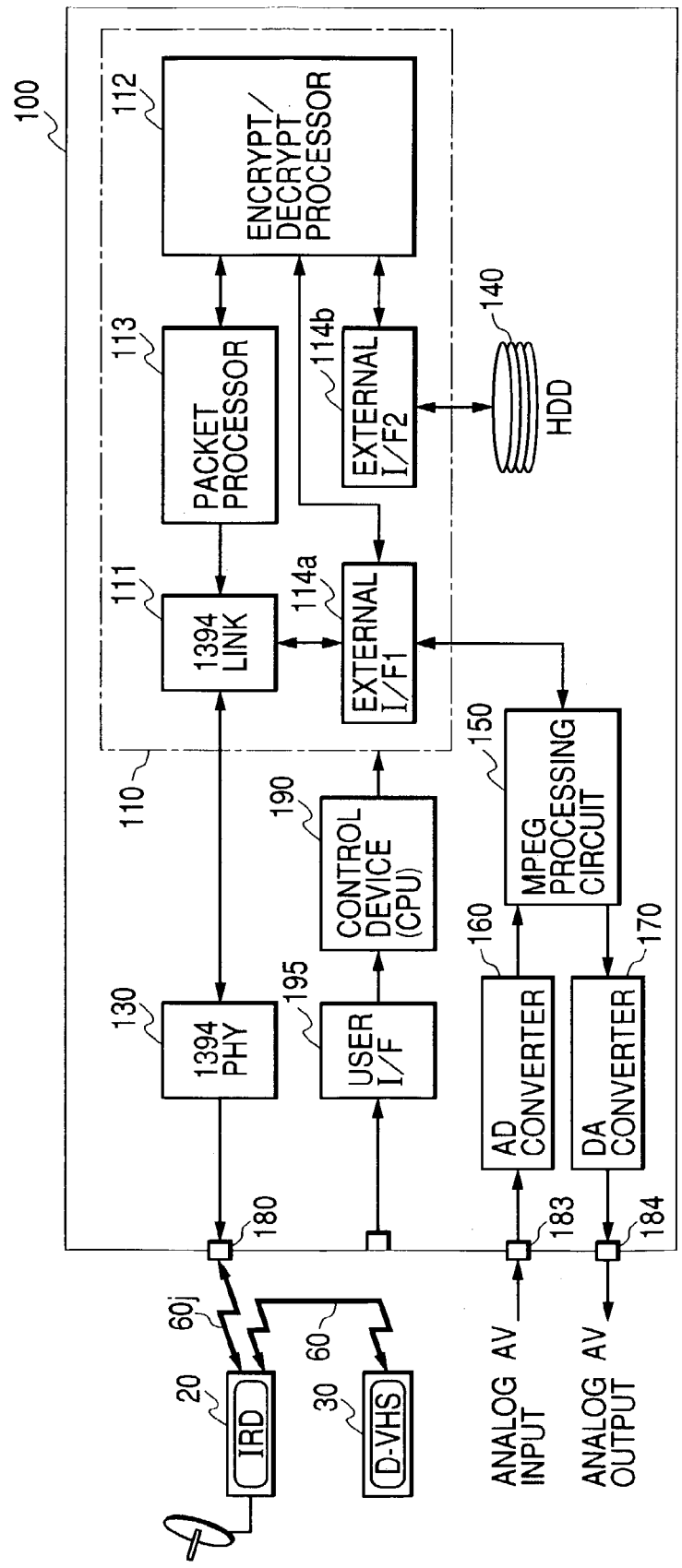
FIG. 3 is a block diagram showing a configurational example of an HDD recorder used as the recording/reproducing apparatus equipped with the cryption and decryption communication semiconductor device according to the embodiment shown in FIG. 1.

FIG. 3 shows a configurational example of an HDD recorder to which the cryption and decryption communication semiconductor device 110 according to the embodiment shown in FIG. 1 is applied. In FIG. 3, devices, circuits and parts identical to those shown in FIG. 1 are respectively identified by the same reference numerals. A register unit 115 is omitted from the drawing. In the HDD recorder, a reproduction-side device 150 is an MPEG processing circuit, an AD converter 160 is provided between the MPEG processing circuit 150 and an analog input terminal 183, and a DA converter 170 is provided between the MPEG processing circuit 150 and an analog output terminal 184.

Figure 10:
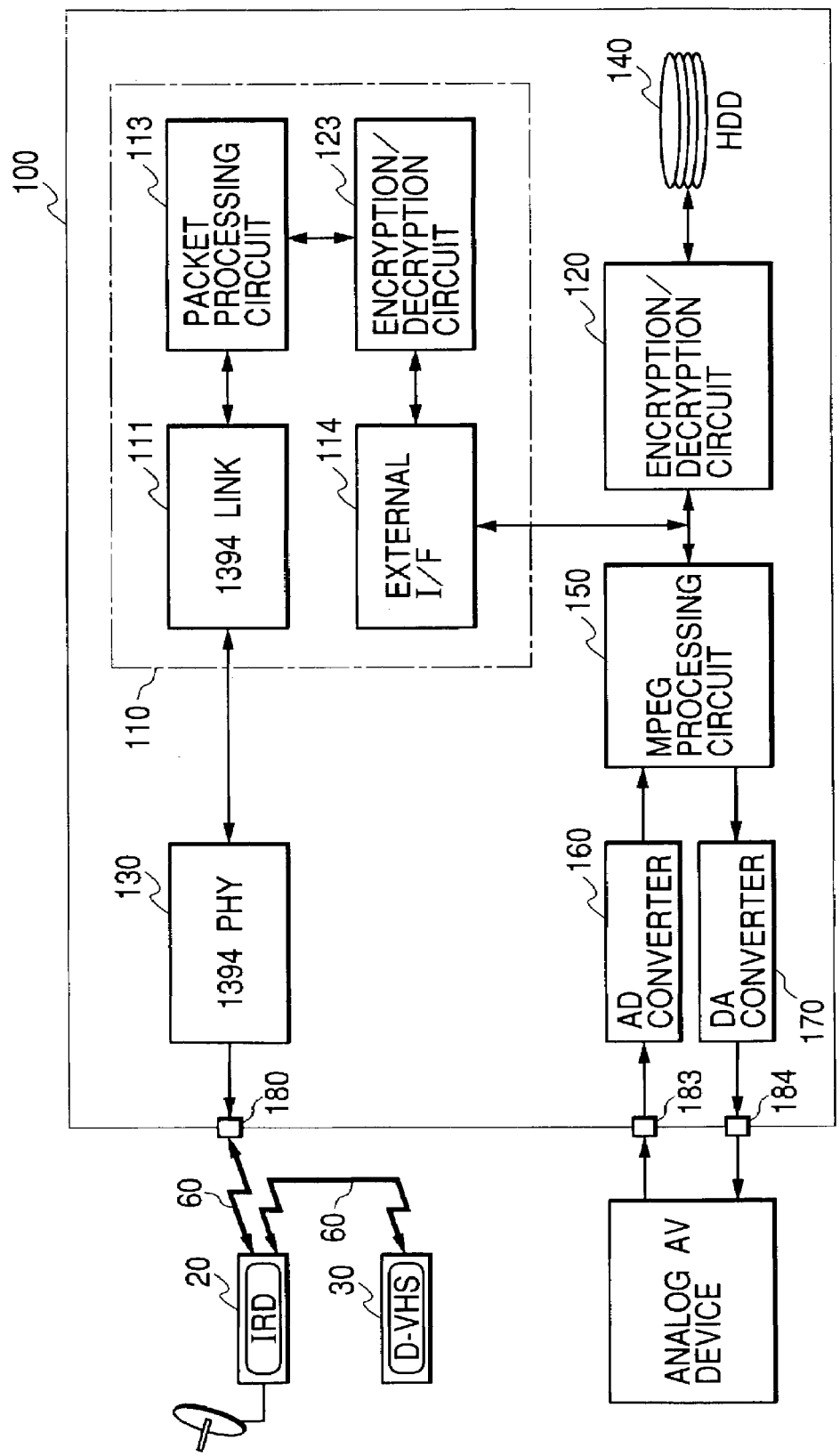
FIG. 10 is a block diagram depicting a configurational example illustrative of a previously-discussed cryption and decryption communication semiconductor device and an HDD recorder used as a recording/reproducing apparatus using the same.

It is understood from a comparison between FIG. 3 and FIG. 10 showing the configuration of the previously-considered HDD recorder that since the encryption/decryption circuit 120 for recording to HDD can be made unnecessary owing to the application of the cryption and decryption communication semiconductor device 110 according to the present invention, the present HDD recorder can be simplified in configuration as compared with the HDD recorder shown in FIG. 10. Incidentally, although not shown in FIG. 10, even the HDD recorder is provided with a control device 190 made up of a CPU or the like and a user interface 195. As devices capable of recording digital contents, may be mentioned, a CD-R device, a CD-RW device, a DVD-RAM device, an MO device, etc. in addition to the HDD recorder. The present invention can be applied even to these devices.

(Second Embodiment)

Figure 4:
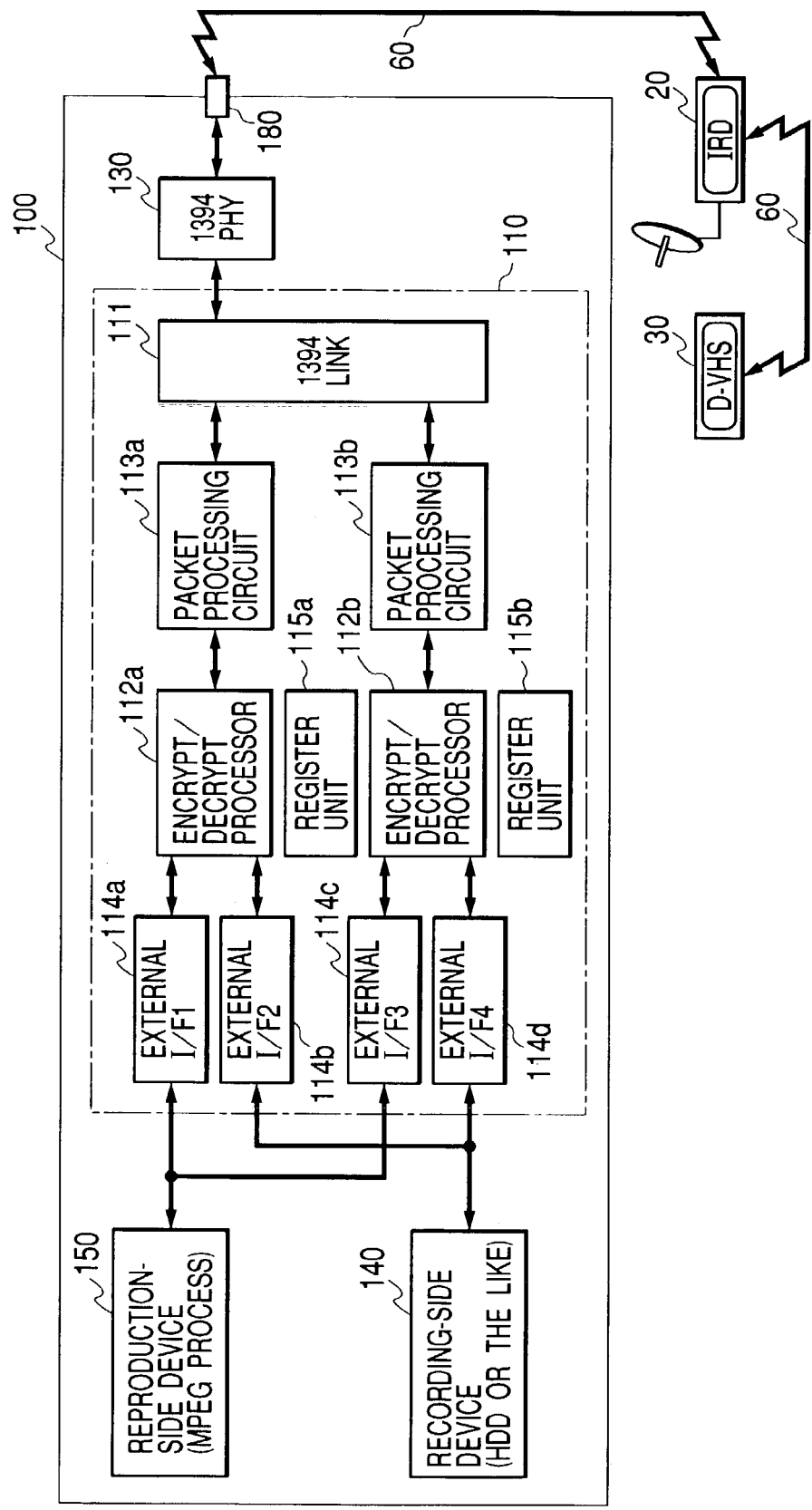
FIG. 4 is a block diagram showing a second embodiment illustrative of an encryption and decryption communication semiconductor device to which the present invention is applied, and a recording/reproducing apparatus equipped therewith.

FIG. 4 shows a second embodiment illustrative of a 5C-DTCP spec cryption and decryption communication semiconductor device to which the present invention is applied, and a recording/reproducing apparatus equipped therewith. In FIG. 4, devices, circuits, and parts identical to those shown in FIG. 1 are respectively identified by the same reference numerals and the description of certain common ones will be omitted.

In the present embodiment, a first external interface 114a, a second external interface 114b, a third external interface 114c, a fourth external interface 114d, a 5C-DTCP spec first encrypt/decrypt processor 112a connected to the first and second external interfaces, a 5C-DTCP spec second encrypt/decrypt processor 112b connected to the third and fourth external interfaces, a packet processing circuit 113a and a packet processing circuit 113b based on specs of the IEC61883 standard, which are respectively connected to the encrypt/decrypt processor 112a and the encrypt/decrypt processor 112b, a 1394 LINK 111 based on specs of a LINK layer of the IEEE1394 standard, which is capable of simultaneously performing data processing for two-system packet processing circuits of the packet processing circuits 113a and 113b, etc. are formed on a single semiconductor chip like monocrystal silicon to thereby constitute an encryption and decryption communication semiconductor device 110.

Incidentally, each of the encrypt/decrypt processors 112a and 112b is provided with a function similar to the encrypt/decrypt processor 112 employed in the first embodiment, and each of the packet processing circuits 113a and 113b has a function similar to the packet processing circuit 113 employed in the first embodiment. The first external interface 114a and the third external interface 114c are similar to the first external interface 114a employed in the first embodiment, and the second external interface 114b an the fourth external interface 114d are similar in configuration to the first external interface 114a employed in the first embodiment. Further, the present embodiment is provided with register units 115a and 115b each having a configuration similar to the register unit 115 shown in FIG. 2, which perform switching to selectors and settings of operation modes in association with the two encrypt/decrypt processors 112a and 112b, respectively. Although not shown in FIG. 4, the recording/reproducing apparatus according to the present embodiment is also provided with a control device 190 made up of a CPU or the like, and a user interface 195.

Operations of the cryption and decryption communication semiconductor device 110 according to the second embodiment and the recording/reproducing apparatus 100 like an HDD recorder equipped therewith will be explained below.

Since mode control and selector switching of the encrypt/decrypt processors 112a and 112b by the register units 115a and 115b are similar to the first embodiment, their detailed description will be omitted here. However, the encrypt/decrypt processor 112a encrypts, decrypts or passes therethrough the content from, for example, an IRD 20, which has been received from a 1394 cable 60, via the 1394 LINK 111 and the packet processing circuit 113a according to combinations of settings of registers REG1, REG2 and REG3. Consequently, the content is reproduced by a reproduction-side device 150 via the first external interface 114a or recorded in a recording-side device 140 via the second external interface 114b. Simultaneously with the above, the encrypt/decrypt processor 112b encrypts, decrypts or passes therethrough the content from, for example, a D-VHS 30 via the 1394 LINK 111 and the packet processing circuit 113b. Consequently, the content can be recorded in the recording-side device 140 via the fourth external interface 114d or reproduced by the reproduction-side device 150 through the third external interface 114c.

According to combinations of settings of the register units 115a and 115b of the encrypt/decrypt processors 112a and 112b, the encrypt/decrypt processor 112a encrypts, decrypts or passes therethrough the content from the reproduction-side device 150 via the first external interface 114a or the content from the recording-side device 140 via the second external interface 114b and transmits it to the 1394 cable 60 via the packet processing circuit 113a and 1394 LINK 111. Simultaneously, the encrypt/decrypt processor 112b encrypts, decrypts or passes therethrough the content from the reproduction-side device 150 via the third external interface 114c or the content from the recording-side device 140 via the fourth external interface 114d and is capable of transmitting it to the 1394 cable 60 via the packet processing circuit 113b and the 1394 LINK 111.

Further, the encrypt/decrypt processor 112a and the encrypt/decrypt processor 112b respectively use the first external interface 114a and second external interface 114b and the third external interface 114b and fourth external interface 114d according to the combinations of the settings of the register units 115a and 115b of the encrypt/decrypt processors 112a and 112b. The apparatus has even the function of performing a recording/reproducing operation singly without via the 1394 cable 60. Namely, in the present embodiment, another signal processing system comprising the pair of external interfaces designated at numeral 114c and 114d, the encrypt/decrypt processor 112b and the packet processing circuit 113b is additionally provided in addition to the configuration of the cryption and decryption communication semiconductor device according to the first embodiment. Consequently, the two-system circuits can be operated in parallel. Thus, even except for the simultaneous reception from the 1394 cable 60 and the simultaneous transmission to the 1394 cable 60, the apparatus enables a recording and reproducing operation using the encrypt/decrypt processors independently simultaneously with the reception of the content from the 1394 cable 60 on one hand and the transmission thereof to the 1394 cable 60 on the other hand.

A specific use example is as follows. While, for example, the content received from the IRD 20 is being recorded in the recording-side device 140 via the 1394 LINK 111, the packet processing circuit 113a, the encrypt/decrypt processor 112a and the second external interface 114b, the content recorded in the recording-side device 140 can be produced by the reproduction-side device 150 by way of the fourth external interface 114b, the encrypt/decrypt processor 112b, and the third external interface 114c. Namely, even when the viewing of the received content is interrupted in the course of its viewing while being recorded, such time shift reproduction or the like as to resume its viewing a few minutes later from the time when the viewing is interrupted, can be realized by only the encrypt/decrypt processors 112a and 112b built in the cryption and decryption communication semiconductor device 110 in the HDD recorder 100 according to the present embodiment.

(Third Embodiment)

Figure 5:
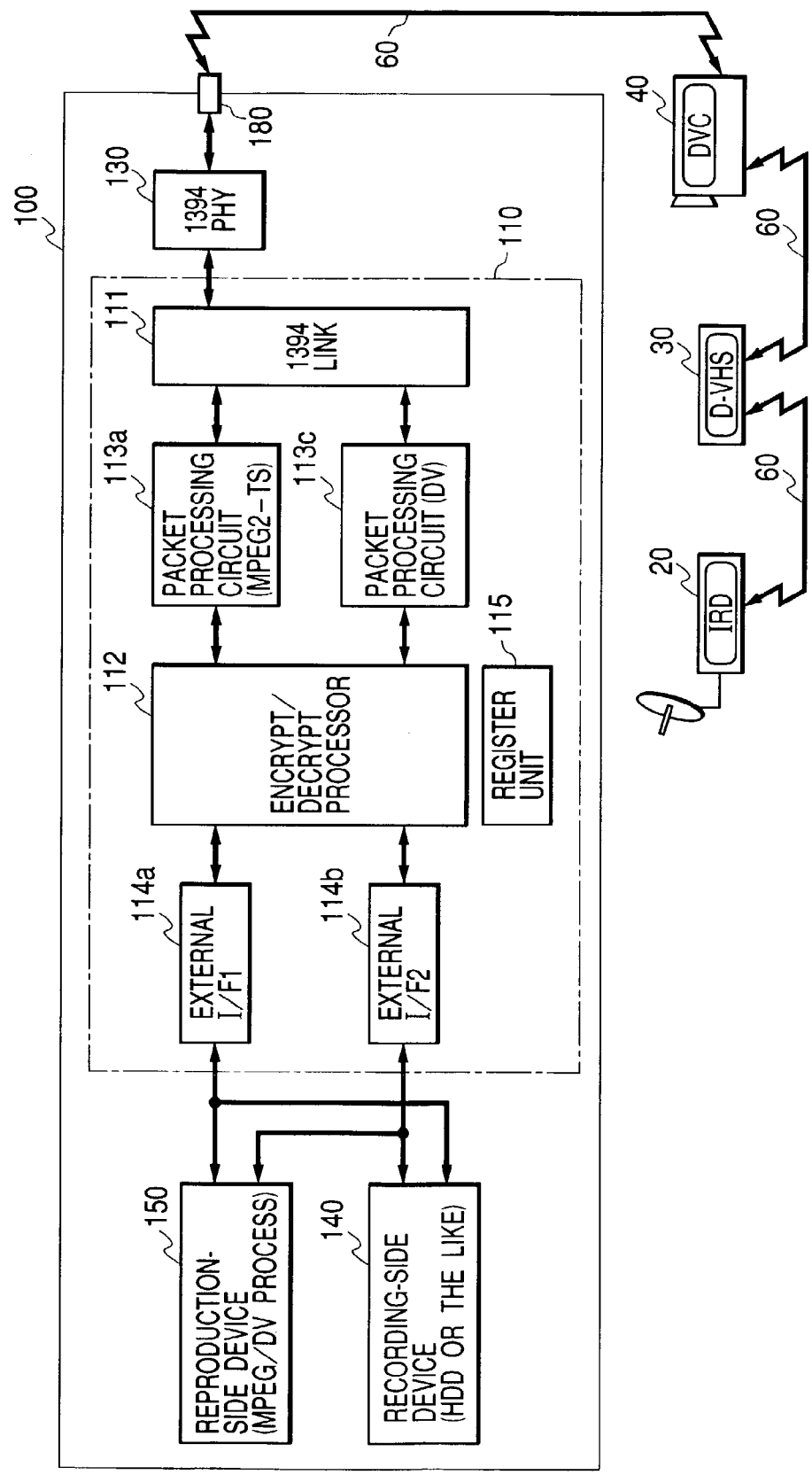
FIG. 5 is a block diagram showing a third embodiment illustrative of an encryption and decryption communication semiconductor device to which the present invention is applied, and a recording/reproducing apparatus equipped therewith.

FIG. 5 shows a third embodiment illustrative of a 5C-DTCP spec cryption and decryption communication semiconductor device to which the present invention is applied, and a recording/reproducing apparatus equipped therewith.

In the present embodiment, a first external interface 114a, a second external interface 114b, a 5C-DTCP spec encrypt/decrypt processor 112, packet processing circuits 113a and 113c based on specs of the IEC61883 standard, and a 1394 LINK 111 based on specs of a LINK layer of the IEEE1394 standard, which is capable of simultaneously performing data processing for two-system packet processing circuits of the packet processing circuits 113a and 113c are formed on a single semiconductor chip like monocrystal silicon to thereby constitute an encryption and decryption communication semiconductor device 110. Although not shown in FIG. 5, the recording/reproducing apparatus according to the present embodiment is also provided with a control device 190 made up of a CPU or the like, and a user interface 195.

FIG. 5 is different from FIG. 1 showing the first embodiment in that the external interface 114a is of an interface for data of a MPEG2-TS format, whereas the external interface 114b is of an interface for data of a DV format, and the packet processing circuit 113a is configured so as to be capable of coping with the MPEG2-TS format and the packet processing circuit 113c is configured so as to be capable of coping with the DV format. Since the DV format and the MPEG2-TS format are different in data length, the encrypt/decrypt processor 112 is slightly different from that shown in FIG. 1. A recording-side device 140 and a reproduction-side device 150 respectively have input/output terminals for MPEG data and input/output terminals for DV format data.

Figure 6:
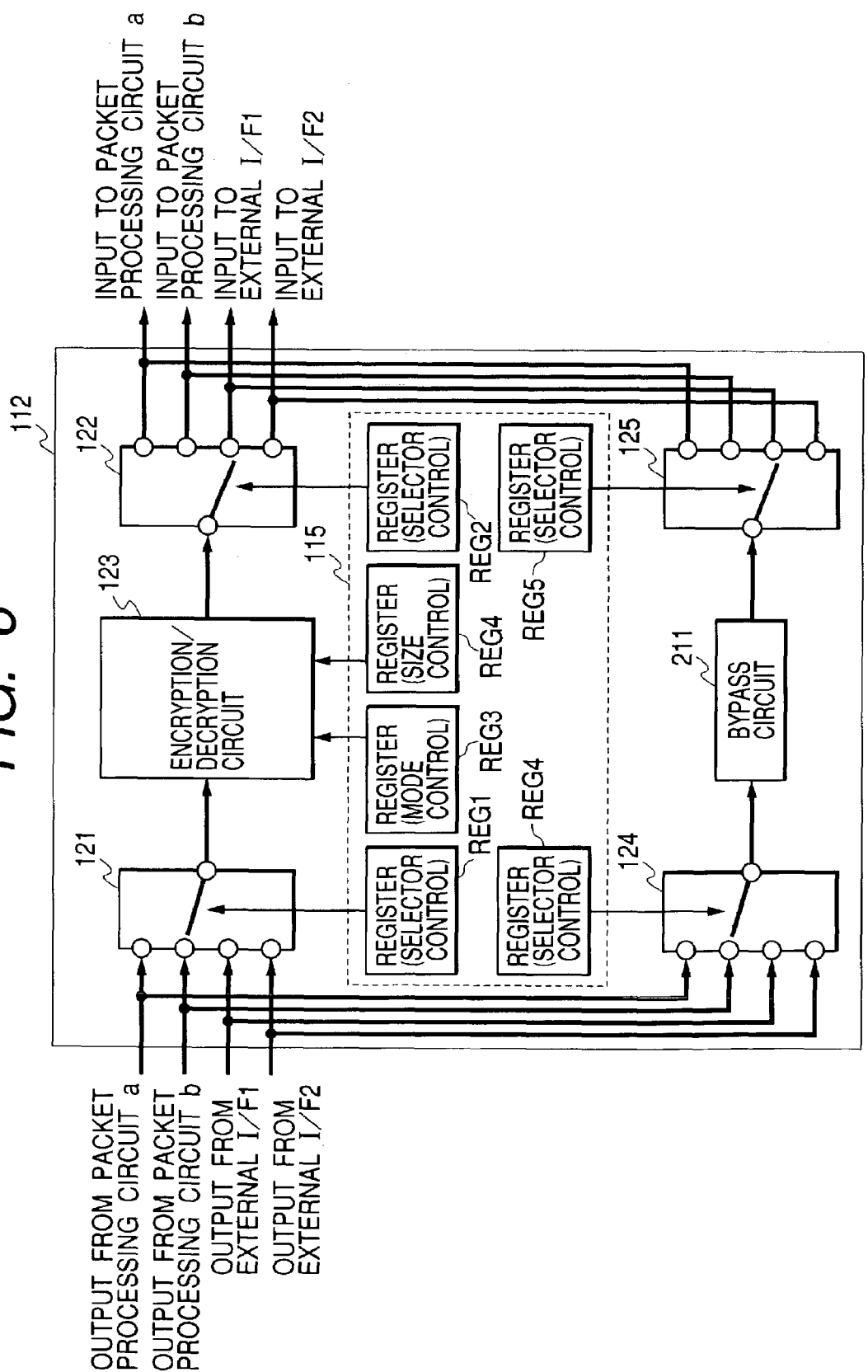
FIG. 6 is a block diagram illustrating a configurational example of an encrypt/decrypt processor of the cryption and decryption communication semiconductor device according to the embodiment shown in FIG. 5.

FIG. 6 shows a configurational example of the encrypt/decrypt processor 112 employed in the third embodiment of FIG. 5. As shown in FIG. 6, the encrypt/decrypt processor 112 employed in the third embodiment comprises an encryption/decryption circuit 123, an input data selector 121 for selecting data inputted to the encryption/decryption circuit 123, a register REG1 for controlling the selector 121, a selector 122 for selecting data outputted from the encryption/decryption circuit 123, a register REG2 for controlling the selector 122, a register REG4 for setting the size of data inputted to the encryption/decryption circuit 123 in addition to a register REG3 for selecting an operation mode of the encryption/decryption circuit 123, a bypass circuit 121 for bypassing data without effecting processing on the data, an input data selector 124 for selecting data inputted to the bypass circuit 121, a register REG5 for controlling the selector 124, an output data selector 125 for selecting the data outputted from the bypass circuit 121, and a register REG6 for controlling the selector 125. The output data selectors 122 and 125 are respectively controlled by the registers REG2 and REG5 so as not to select the same output paths.

The operation of the recording/reproducing apparatus 100 according to the present invention will be described as follows.

When the content of the MPEG2-TS format is handled, the input data selector 121 is first controlled by the register REG1 and the output data selector 122 is controlled by the register REG2 in such a manner that the MPEG2-TS content inputted to the first external interface 114a, the second external interface 114b, or the packet processing circuit 113a is processed by the encryption/decryption circuit 123 and outputted to the first external interface 114a, the second external interface 114b, or the packet processing circuit 113a.

On the other hand, since an encrypting process is unnecessary where the content of the DV format is handled, the selectors 124 and 125 are respectively controlled by the registers REG4 and REG5 in such a way that the DV content inputted to the first external interface 114a, the second external interface 114b, or the packet processing circuit 113b is outputted to the first external interface 114a, the second external interface 114b, or the packet processing circuit 113b via the bypass circuit 121. When, for example, the content of a DV format is received from a DVC 40 via a 1394 cable 60, the registers REG4 and REG5 are set in such a manner that an input sent from the packet processing circuit 113c is outputted to the first or second external interface via the bypass circuit 121 by the input data selector 124 and the output data selector 125. When the content sent from the external device 140 or 150 is transmitted to the DVC 40 via the 1394 cable 60 in reverse, the registers REG4 and REG5 are set in such a manner that an input sent from the first or second external interface 114a or 114b is outputted to the packet processing circuit 113c via the bypass circuit 121 by the input data selector 124 and the output data selector 125.

Further, the content of the MPEG2-TS format and the content of the DV format can be simultaneously transmitted and received via the 1394 cable in the present embodiment. In this case, for example, the first external interface 114a and the second external interface 114b may be used for the MPEG2-TS format and the DV format respectively. Further, when the recording/reproducing apparatus is activated singly, the first external interface 114a and the second external interface 114b are both used for the MPEG2-TS format, and the content recorded in the recording-side device 140 is read and inputted to the encrypt/decrypt processor 112 through the second external interface 114b, where it holds as it is or is decrypted, which in turn is supplied via the first external interface 114a to the reproduction-side device 150, where it can be reproduced.

As shown in FIG. 6, the input data selectors 121 and 122 are switched according to the settings of the registers REG1 and REG2 to thereby make it possible to control the inputs/outputs of the encryption/decryption circuit 123 and the packet processing circuit 113c for the DV format. Since the encryption/decryption circuit 123 is capable of varying an encryptable and decryptable data size, one encryption/decryption circuit 123 is capable of effecting encryption and decryption even on the content of the DV format in a manner similar to the content of the MPEG2-TS format. Namely, since the MPEG2-TS format is defined as 188 bytes in the IEC61883 standard, and an SD format is defined as 480 bytes, an HD format is defined as 960 bytes and an SDL format is defined as 240 bytes in the case of DV, the sizes each matched with the format of the content to be encrypted or decrypted are set to the register REG4 to control the encryption/decryption circuit 123, whereby data of various sizes can be encrypted or decrypted.

(Fourth Embodiment)

Figure 7:
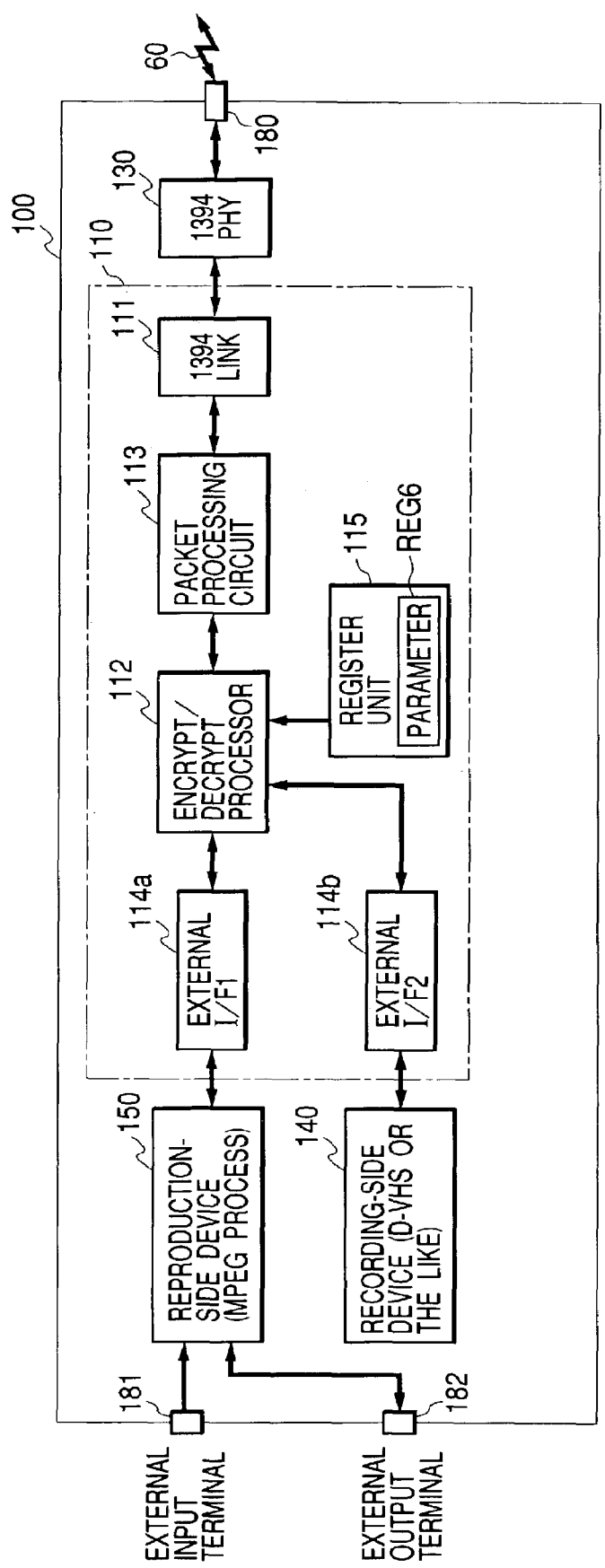
FIG. 7 is a block diagram depicting a fourth embodiment illustrative of an encryption and decryption communication semiconductor device to which the present invention is applied, and a recording/reproducing apparatus equipped therewith.

FIG. 7 shows a fourth embodiment illustrative of an encryption and decryption communication semiconductor device to which the present invention is applied, and a recording/reproducing apparatus equipped therewith.

The cryption and decryption communication semiconductor device 100 according to the present embodiment is provided with a register REG6 for setting computing parameters for an encrypt/decrypt processor 112 to the register unit 115 of the cryption and decryption communication semiconductor device 110 according to the first embodiment. Here the parameters are defined as a method of sorting data at an encryption/decryption operation or computation, constant values used during a computation, the number of times of computations, etc. However, the parameters are not limited to them. Although not shown in the drawing, the register unit 115 is provided with selector control registers REG1 and REG2, and a register REG3 for setting an operation mode of an encryption/decryption circuit 123 in addition to a parameter register REG6. Further, the recording/reproducing apparatus according to the present embodiment is also provided with a control device 190 made up of a CPU or the like, and a user interface 195.

Figure 8:
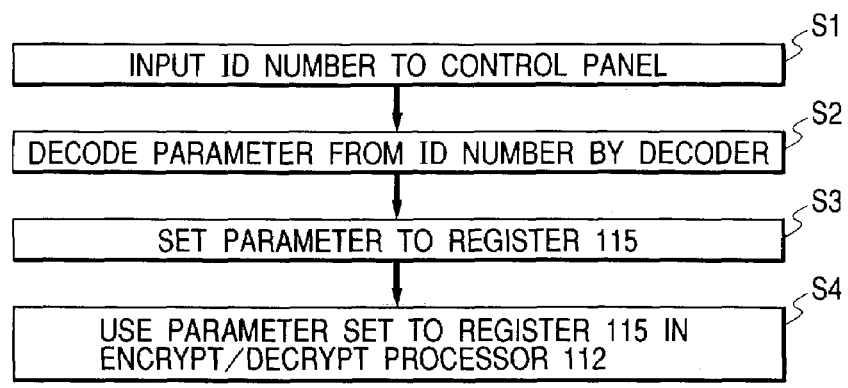
FIG. 8 is a flowchart for describing a specific example of a method of setting parameters for an encrypt/decrypt processor employed in the cryption and decryption communication semiconductor device according to the embodiment shown in FIG. 7.

FIG. 8 shows one example of a method of setting parameters to the register REG6. According to the setting method employed in the present embodiment, an identification number like, for example, four digits is inputted to a control panel such as a remote controller or the like when a user is desired to record the content (Step S1). In doing so, the control device 190 decodes the identification number through the use of a decoder provided thereinside and sets the resultant parameters to the register unit 115 (Steps S2 and S3). Thereafter, when the apparatus performs a recording process, the parameters set to the register REG6 are used for encrypt operations (Step S4). When the same number as the identification number inputted upon recording is inputted to the control panel upon viewing the recorded content if done this way, parameters decoded in a manner similar to at the encrypting process are set to the register unit 115. Therefore, the content encrypted using the same parameters can be decrypted. However, the parameter setting method is not limited to it.

A description will be made below, of an example in which a recording apparatus equipped with the cryption and decryption communication semiconductor device 110 according to the present embodiment is of a D-VHS apparatus 30.

In the D-VHS apparatus, a recording-side device 140 serves as a video tape driving device. A reproduction-side device 150 is provided with an external input terminal 181 to which the content supplied from a tuner or the like is inputted, and an external output terminal 182 which outputs data to a TV or the like. In the D-VHS apparatus, the system of encrypting the content transmitted to a 1394 cable 60, and the system of decrypting the content received from the 1394 cable 60 are respectively defined based on the 5C-DTCP specs. Therefore, the content requiring the protection of copyright, which goes through the 1394 cable 60, needs to be based on the 5C-DTCP specs. However, when the content inputted from the external input terminal 181 is encrypted so that others cannot view it upon recording to a D-VHS tape, the 5C-DTCP spec encryption/decryption circuit is used to arbitrarily set one or more of the above parameters, whereby the content can be encrypted and decrypted in accordance with an algorithm different from an encryption/decryption algorithm based on the 5C-DTCP specs. The flow of content data in the cryption and decryption communication semiconductor device 110 at this time is similar to the case in which the apparatus according to the first embodiment is singly activated.

Equipping the D-VHS device with the cryption and decryption communication semiconductor device according to the present embodiment as described above makes it possible to encrypt and record the content upon recording to a carryable recording media. Even when the media falls into the hands of others, the recorded content can be set such that it cannot be easily viewed if the identification number used upon recording is not recognized.

Even with respect to the cryption and decryption communication semiconductor device 110 (FIG. 6) according to the third embodiment, the register REG6 for setting the computing parameters for the encryption/decryption circuit 112 may be provided for the register unit 115 (FIG. 7) in a manner similar to the fourth embodiment. Thus, a user is able to arbitrarily encrypt the content of the DV format and record the encrypted content in its corresponding recording media.

(Fifth Embodiment)

Figure 9:
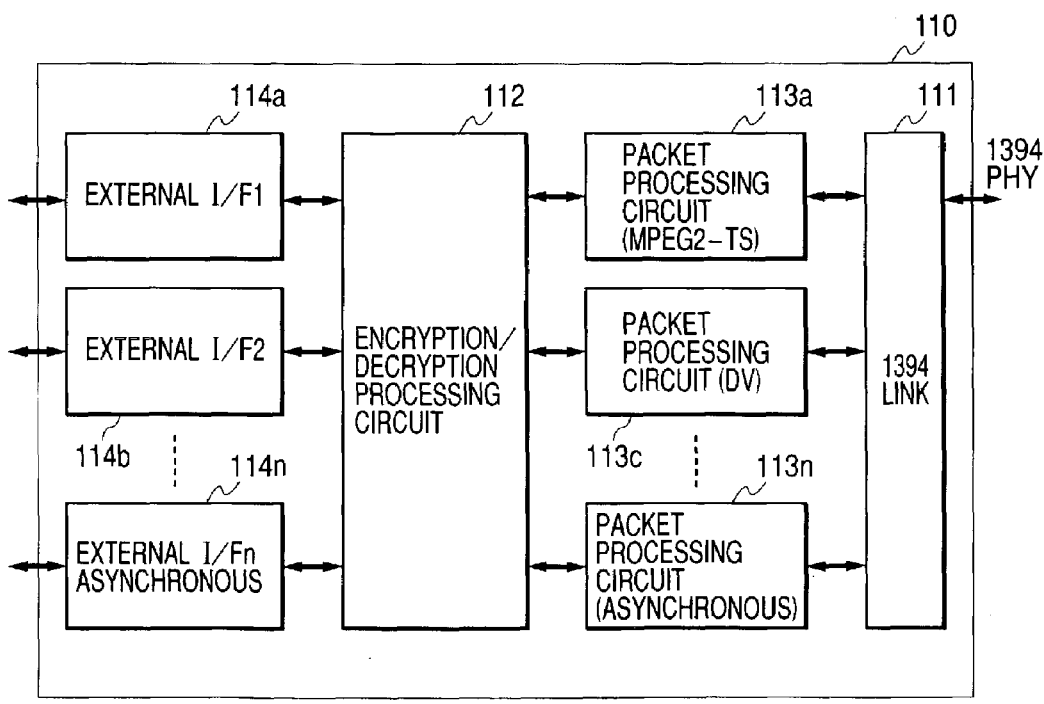
FIG. 9 is a block diagram showing a fifth embodiment of an encryption and decryption communication semiconductor device to which the present invention is applied.

FIG. 9 shows a fifth embodiment of the present invention. An encryption and decryption communication semiconductor device 110 according to the fifth embodiment is one wherein a plurality of packet processing circuits 113a through 113n and external interfaces 114a through 114n are further provided in the cryption and decryption communication semiconductor device (FIG. 5) according to the third embodiment, whereby one encrypt/decrypt processor 112 is capable of performing encrypting and decrypting processes even on a plurality of types of content format data other than the MPEG2-TS format and the DV format, and data transferred according to asynchronous transfer used for the transfer of communication commands, etc.

While the invention made above by the present inventors has been described specifically based on the illustrated embodiments, the present invention is not limited to the embodiments. It is needless to say that various changes can be made thereto within the scope not departing from the substance thereof. Each of the cryption and decryption communication semiconductor devices according to the embodiments shown in FIGS. 4, 5, and 7, for example, may take such a configuration as to be provided with even the 1394 PHY chip on the same chip.

While the above description has principally been made of the case in which the invention made by the present inventors is applied to the 5C-DTCP spec cryption and decryption communication semiconductor device which belongs to the field of application corresponding to the background of the invention, the cryption and decryption communication semiconductor device of the present invention can be used not only for AV recording/reproducing apparatuses such as D-VHS, a HDD recorder but also for a personal computer or the like.

Advantageous effects obtained by a typical one of the inventions disclosed in the present application will be described in brief as follows:

According to the present invention, an encrypt/decrypt processor built in an encryption and decryption communication semiconductor device has the function of operating singly. Thus, when a recording/reproducing apparatus for performing recording and reproduction is equipped with the cryption and decryption communication semiconductor device of the present invention, an encrypt/decrypt processor used upon recording can be cut down and a recording/reproducing apparatus for protecting copyright of the content to be recorded can be realized. Further, electronic equipment can be realized which is capable of arbitrarily encrypting the content inputted from outside and recording it in a recording media.

What is claimed is:

1. An encryption and decryption communication semiconductor device, comprising:
   a link circuit which performs a process based on specs of a LINK layer of an IEEE1394 standard;
   a communication circuit provided between the link circuit and an external terminal to which a communication medium is connected, and which performs transmission/reception of isochronous data to and from an external device via the communication medium;
   a packet processing circuit which generates a transmit packet of a predetermined format containing transmit data and extracts received data included in a received packet;
   an encryption/decryption device which performs encryption and decryption of isochronous data; and
   a plurality of interfaces, each of which enables a connection to a corresponding external device for recording or reproducing the isochronous data, and which can perform input/output of isochronous data from and to the link circuit via the encryption/decryption device and from and to the corresponding external device; and
   wherein the plurality of interfaces include a first interface enabling a connection to a device for reproducing isochronous data and a second interface enabling a connection to a device for recording isochronous data, and
   the encryption/decryption device encrypts data inputted from the first interface and outputs the encrypted data to the second interface, and decrypts data inputted from the second interface and outputs the decrypted data to the first interface.

2. The recording/reproducing apparatus according to claim 1, wherein the isochronous data includes video data.

* * * * *